June 28, 1938.  W. KRUSE ET AL  2,121,875
PROCESS FOR STERILIZING AND DISINFECTING
Filed Aug. 23, 1933   3 Sheets-Sheet 1
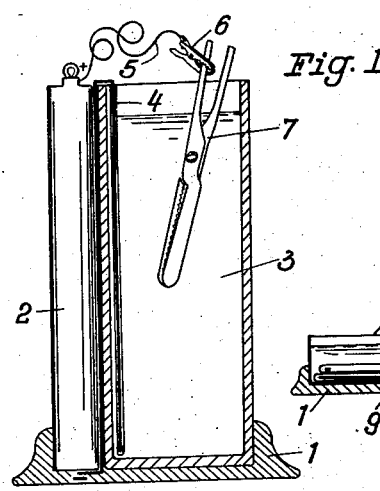
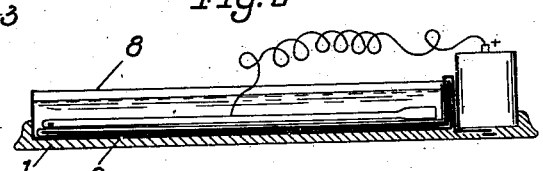
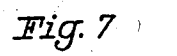
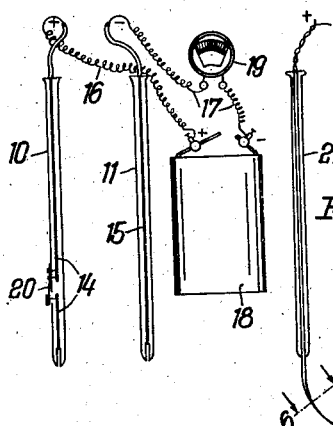
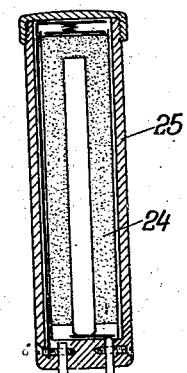
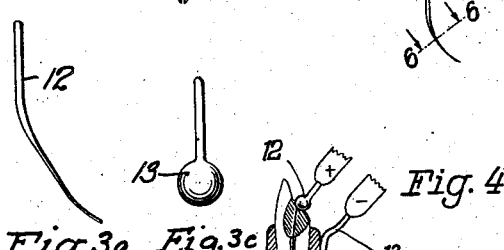
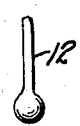
Inventors:
Walter Kruse,
Maximilian Johann Fischer
by S. Sokal, Attorney

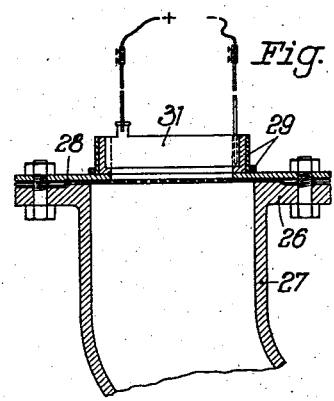
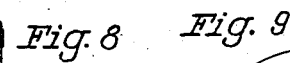
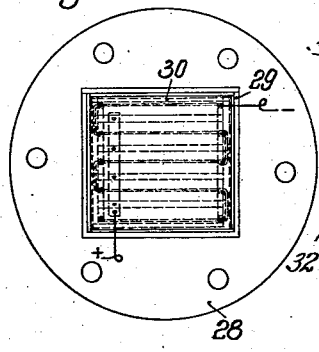
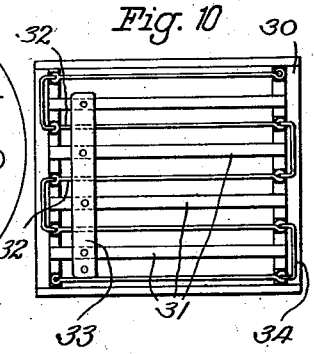
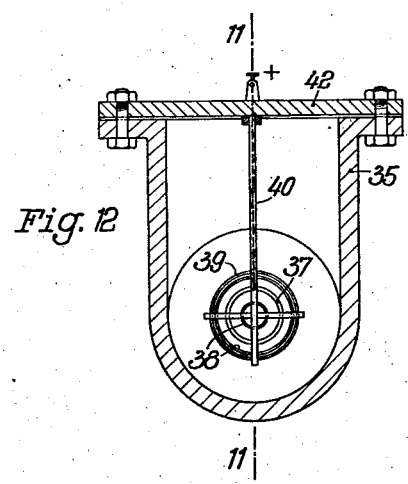
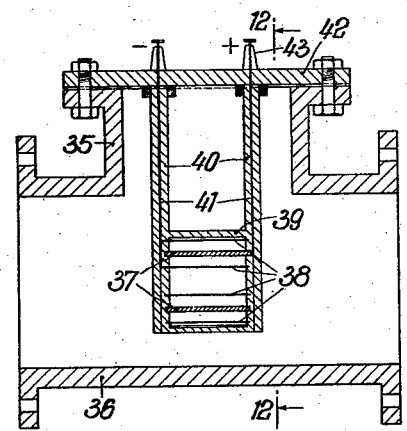
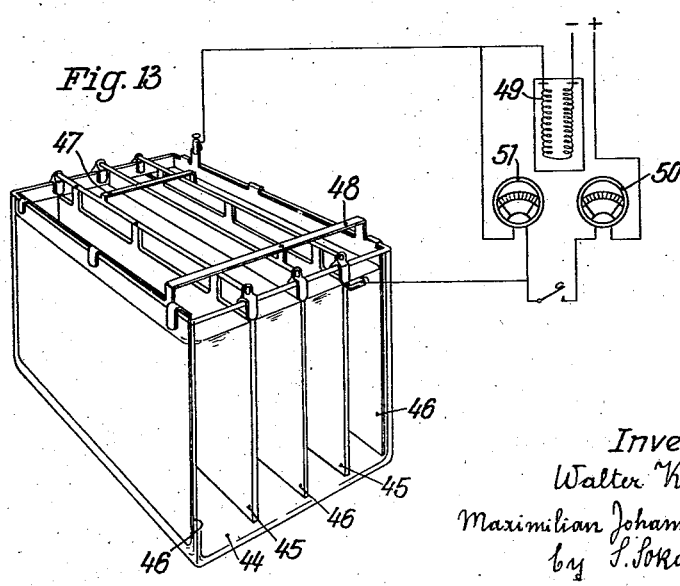

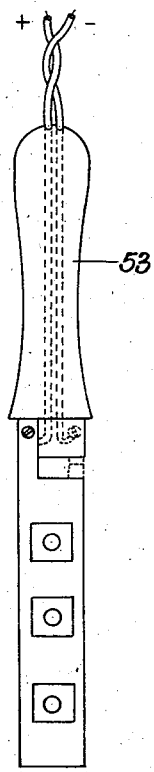
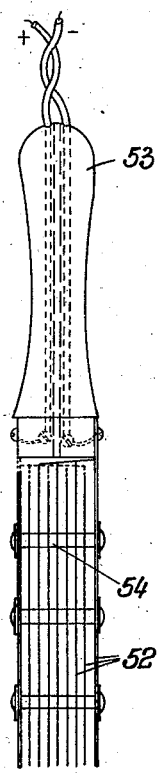
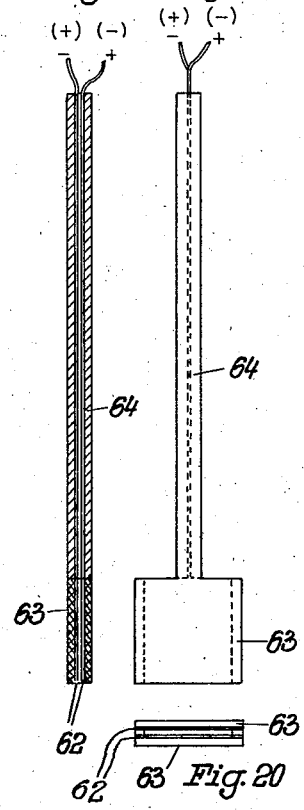
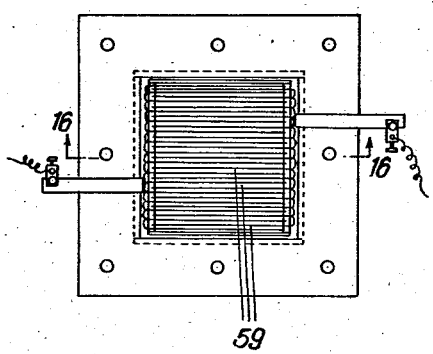
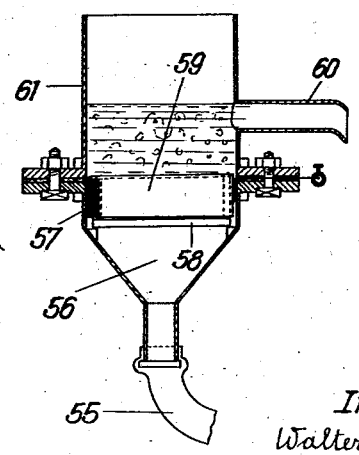

Patented June 28, 1938

2,121,875

UNITED STATES PATENT OFFICE 2,121,875

PROCESS FOR STERILIZING AND DISINFECTING

Walter Kruse and Maximilian Johann Fischer, Leipzig, Germany, assignors to Curt Angelmi, Leipzig, Germany Application August 23, 1933, Serial No. 686,426 In Germany June 8, 1929

5 Claims. (Cl. 204—24)

We have filed applications in Germany on 8th June, 1929; 29th December, 1930; 23rd March, 1932; 7th April, 1932; 7th April, 1932 claiming the priority of 10th December, 1931; 15th May, 1933.

The present invention relates to processes and apparatuses for the production of oligodynamically active substances for sterilizing and disinfecting.

It is known that silver and chlorine are substances which, even in the most highly diluted form (for example, in chloride-containing solutions containing 1 part in 1 million parts or 1 part in several million parts), exert a sterilizing action on water and also produce powerful disinfecting effects in the presence of other inorganic or organic solutions when brought into solution therein. Silver and chlorine exhibiting the aforesaid properties are hereinafter termed oligodynamically active substances. The term "oligodynamically active" was originally employed by Nägeli only in connection with the action of so-called pure metals in water to define the nature of the activity, and has since been employed by other writers in various slightly different meanings, but in this specification the term is used in the above-defined sense. The present invention is based on the discovery that the so-called oligodynamic action of the metals, that is to say the germ destroying action of the metals, particularly the precious metals, can be produced in the highest degree by inserting the metals in question as anodes in the circuit of an electric current. If, for example, two pieces of silver are suspended in any dilute electrolyte, for example physiological common salt solution, and a weak current is passed through them, then only the anode silver plate becomes oligodynamically active. If the said plate is placed on a cultivation surface which has been sown with bacteria then it will be observed that after 24 hours the anode is surrounded by a space which is free from germs, whilst the space surrounding the cathode and the plate itself is uniformly and thickly coated with bacteria colonies. The cathode is meanwhile of pure metallic appearance whilst the anode is of dull appearance and is more or less discoloured. It is clear that under the influence of the current passing through the anode silver compounds are formed which exhibit antiseptic action. This discovery is employed according to the invention in many novel technical applications. In the first place, silver or silvered chirurgical or hygienic instruments may, for example, be coated in dilute soda or common salt solution by means of the current passing through the anode with a layer of "oligodynamically active substance", which is then transmitted to the tissue in the living body and prevents infection. In particular, such places as might be damaged by pinching with forceps, tweezers, hooks, catheters and so forth in respect to their capacity as living organisms are protected against infection by the oligodynamically active substance.

It will, of course, be understood that the aforesaid action disappears gradually but it can be renewed at any time by fresh anodization, activation, or restoration of the oligodynamic action, and, in fact, the said operation may be effected whilst the apparatus is actually in the living body. The sterilization of the passages of roots of teeth, which is known to be one of the most difficult operations in dentistry, can thus be effected by inserting a silver wire which has been rendered active into the root passage and leaving it in this position, whilst from time to time by means of a dry battery, the cathode of which is placed upon the gum, the wire is again rendered anodically active. The same method may likewise be employed in the case of permanent catheters and the like.

Whilst in these two cases the oligodynamically active substance adheres to the surfaces of the silver and physiological "solution" is thus gradually imparted by them to the living tissue, it is possible, in the case of an electrolyte which is as weak as water and is only used in small quantities, to effect sterilization very simply by either suspending in it a silver plate which has previously been rendered active as above indicated or by employing an immersion member having two silver electrodes of rod form and a dry battery in a handle attached thereto, whereby within a few seconds the necessary quantity of active material can be introduced. Large quantities of water, particularly flowing water, can be sterilized if the coating of the silver by means of the current passing through the anode is repeated from time to time or in a still simpler manner if an intermittent or continuous current is passed through the silver anode, the cathode being composed of any desired suitable metal. The oligodynamic substance does not adhere in this case to the anode but is discharged from it in the form of clouds. For example, the water in a public bath (1000 cubic metres per day) was sterilized by employing an aggregate of plates which was not larger than the size of a hand arranged in front of the opening of the inlet pipe of the water container and provided with four silver anode plates measuring 10 x 2 cm. which were fed with a continuous current of 1.25 amperes at 9 volts. Five copper plates arranged between the anodes externally thereof at a distance of 1 cm. were employed as cathodes. Provision was made by means of an automatic device to ensure that the passage of current was interrupted as soon as the flow of water ceased. Regular attention to the apparatus was hardly necessary but it was switched off during the night, cleaned by brushing from time to time and the silver electrodes which were connected together by means of a bow and weighed altogether 1 kilogramme were renewed every three weeks because by that time they had dissolved except for a small residue. The obvious idea of making the cathodes as well as the anodes of silver, and of reversing the current from time to time was very soon given up, inasmuch as disturbances arose which almost defeated the object in view. It is very important to construct the device in the proper form for the particular constitution of the water in each particular case. In another bath installation, for example, the above-named apparatus would not operate at all. A thick coating of insoluble silver compounds was formed on the anode and the water did not become sterilized. Variations in the strength of the current proved ineffectual. When, however, the distance between the electrodes was doubled the desired result was at once produced. The cause of this resided obviously in the differing constitution of the water which contained a much larger quantity of chlorides, constituents forming hardness and organic constituents, than the water employed in the first mentioned bath installation. In order to avoid failures it is thus necessary to determine in each individual case the correct distance of the electrodes from one another.

The sterilization process for water is as simple and inexpensive as is conceivably possible, inasmuch as the cost of the current hardly comes into consideration and the amount of silver employed is about 15 to 20 grammes per thousand cubic metres for waters which are not very impure and about 50 grammes per thousand cubic metres for water which is very impure. Such quantities of silver are naturally entirely tasteless and harmless.

It must be borne in mind that the oligodynamically active silver does not sterilize the water immediately but only in about 3 to 6 hours.

When large water containers are at disposal the frame containing the aggregate of plates is mounted as above-described on the inlet pipe, i. e. in front of the outlet opening thereof. If, however, the water before it is used has to pass over considerable distances an intermediate arrangement may be employed in which the electrodes are preferably arranged concentrically and are mounted in a T-piece inserted in the pipe in such manner that they are immersed in the water passing the pipe. In front of and behind the T-piece shut-off valves are preferably arranged which are employed when it is necessary to renew or to clean the plate aggregate.

Inasmuch as experience has shown that the oligodynamic effects are produced by pure substances and not, as has sometimes been maintained, by "contact", it seemed to the applicants that it must be possible to produce the said substances in a concentrated state. This has also been successfully effected in two ways. If the electrolytes are used in dilute solutions of N/500 a colloidal solution of active substance which can be stabilized by means of a protecting colloid, is obtained from the silver anode. If, now, the concentration of the electrolytes is increased up to a figure of N/10 to N/20 a very finely divided powder is obtained which can be easily removed from the anode and is very active. If still stronger solutions are used a slate-like material adhering to the silver is obtained which proves to be almost insoluble and inoperative.

It is, however, also possible to obtain oligodynamic effects if the current of low voltage passing through the anode is allowed to act on insoluble electrodes, such as platinum, or Krupp's metal, provided that a dilute electrolyte, containing chlorides, is employed for carrying the current. Every natural water and also so-called distilled water contains sufficient quantities of chorides to develop under the influence of strong currents of low voltage so much active chlorine on a non-corrodible anode that the water is thereby sterilized, the oligodynamic effect produced being precisely similar to that which is obtained in any natural water when silver anodes are used. In the latter case the chlorine passes on to the silver whilst in the former case it is free. This possibility has been hitherto overlooked although the production of chlorine from strong solutions of chloride has been known for a long time. Hitherto it was thought that ordinary water could only be sterilized by treating it with currents of high voltage which caused the development of active oxygen ($O_3$). According to the present invention the formation of ozone is intentionally prevented by the use of currents of low voltage for the reason that this gas smells badly and irritates the respiratory organs, whilst it does not operate so strongly bactericidally as the active chlorine. In order in spite of this to obtain sufficiently strong currents which are necessary for the development of chlorine, the surfaces of the electrodes according to the invention are made as large as possible and their distance apart from one another is made as small as possible. For large quantities of water such as are employed for example for supplying bath and similar installations, hotels and ships, a large plate device is used which may be advantageously mounted on the water pipe in question in such manner that the gases (hydrogen and so forth) arising during the activation can escape. In this manner one or more cubic metres of water per hour can be sterilized.

It is advantageous to add in the first place to the water which is to be sterilized some common salt, for example about 300 to 400 milligrammes per litre. The taste is not altered thereby but the conductivity of the water and the efficiency of the electric current is improved so that the apparatus may be made smaller and the duration of the current treatment can be shortened. A further advantage of the addition of common salt resides in the fact that the natural waters which differ so considerably in their constitution are rendered similar to one another by the uniform addition of the comon salt, so that instructions for the use of the apparatus can be given which hold good for each individual case. The addition of common salt according to the invention has nothing to do with the proposal which has already been made to sterilize water by the electrolysis of a strong solution of common salt in a separate porous cell or a cell bounded by a diaphragm and allowing the chlorine which has developed to act upon the surrounding water by diffusion.

As compared with the activation of the water with silver (Cuma process) the activation without silver (Sina process) has the advantage that the sterilization takes place much more rapidly and in fact in the course of a few minutes. Certainly the latter process is more expensive but for the small quantities of drinking water which one requires to sterilize, for example when travelling, or for household purposes, this fact is not of importance. The necessary supply of electricity is available everywhere nowadays. In a motor car or motor-cycle accumulators are available, but in any case even the dry batters employed for pocket lamps suffice. The Sina process which is suitable for small quantities of water thus forms a complement to the Cuma process, which latter serves for the sterilization of water on a large scale.

It is, however, also possible according to the same principle to sterilize very rapidly so-called physiological salt solutions as also hypo- and hyper-tonic solutions serving for medical purposes and thus to produce solutions having the highest degree of disinfecting power (similar to Dakin's mouth wash employed in the World War). Inasmuch as the conductivity of solutions of this kind is much greater and the yield of active chlorine by means of the current is very much more considerable, than with the ordinary water or waters to which only very little salt has been added, the apparatus can be made of still smaller size and it is sufficient to provide as electrodes two small platinum plates each having a surface of 2 x 2 cm. and arranged parallel to one another at a distance of 1 to 2 millimetres apart in an insulating frame. If, now, the current from one or two accumulators is passed through the apparatus the sterilization of the salt solution takes place almost instantaneously. If the action of the current is prolonged to a period of from 10 to 20 minutes then the preparation of a disinfecting and therefore physiological solution is completed. The advantage offered by the employment of this small apparatus for the practical physician, for hospitals and for first-aid will be obvious. If larger quantities of the sterilizing or disinfecting solution are required the apparatus can naturally be constructed of greater size.

Some preferred constructional forms of apparatuses for carrying out the process according to the invention in the various previously mentioned applications are illustrated by way of example in the accompanying drawings.

Referring to the drawings:

Figs. 1 and 2 each show an arrangement for the activation of chirurgical or hygienic silvered or silver instruments.

The reference numeral 1 denotes a base in which a dry battery 2 and a container 3 are arranged, which latter contains a dilute solution of soda or sodium chloride. In the solution a cathode 4 is immersed which is arranged in a linen bag and is conductively connected with the negative pole of the dry battery. The positive pole of the battery is connected by means of a lead 5 and a clip terminal 6 with the instrument 7 which is to be activated and which is immersed in the solution of sodium chloride.

The modified constructional form according to Fig. 2 differs from that according to Fig. 1 only in that the container 8 for the solution and the cathode 9 are horizontally arranged, this being particularly advantageous in the case of smaller instruments such as silver catheters and the like, i. e. small thin instruments in general.

Fig. 3 shows an arrangement for the treatment of dental instruments for the purpose of internal disinfection.

An anode carrier 10 and a cathode carrier 11 are provided which serve at one end for the attachment of projecting members 12 and 13 respectively forming the anode and cathode respectively and shown in Fig. 3 as being removed from the carriers. The projecting members mounted in the carriers are connected by means of conducting members 14 and 15 respectively embedded in the supports and flexible leads 16 and 17 respectively connected therewith, with the positive and negative poles respectively of a hand lamp battery 18. The current is measured by means of a milliamperemeter 19, and on the anode carrier 10 a switch 20 is provided.

Fig. 4 shows the application of the instrument in the tooth itself. The projecting member 12 of the anode is located in the root passage whilst the projecting member 13 of the cathode is pressed up against the gum. Inasmuch as the silver wire which is introduced into the root passages reaches up to the surface of the tooth a reactivation may be effected in any desired time.

Figs. 5 and 6 show in elevation and in section on line 6—6 of Fig. 5 to an enlarged scale respectively an instrument in which the electrodes, i. e. the anode and the cathode, which are in the form of wires, are arranged in a common carrier 21 in such manner as to be insulated from one another. They are both introduced together into the root passage of the tooth. With this arrangement a stronger activation is obtained.

Fig. 7 shows partly in elevation and partly in section a hand apparatus for the sterilization of small quantities of water. Two silver rods 22 and 23 are fixed in a housing 25 containing a pocket lamp battery 24 and serving as a handle, and are electrically connected with the positive and negative poles respectively of the dry battery. The sterilization of the quantities of water is effected by immersing the silver rods therein.

Figs. 8 to 10 show an arrangement for the sterilization of flowing water. In these figures:

Fig. 8 is a longitudinal section through the discharge end of the supply pipe,

Fig. 9 is an end elevation thereof, and

Fig. 10 is an elevation of the interchangeable plate frame.

On an end flange 26 of the pipe 27 a plate 28 provided in the middle with an opening is screwed. The opening, which is rectangular, is surrounded by an insulating frame 29 which is fixed to the plate and in which a frame 30 carrying the electrode plates is mounted. In the frame 30 four thick silver plate anodes 31 and five copper plate cathodes 32 are mounted. The anode plates are connected by means of a bridge 33 whilst the copper cathodes are connected on the two sides alternately by means of leads 34. The said arrangement is suitable for an upwardly directed water discharge. In the case of a horizontal or downwardly directed discharge or a discharge inclined slightly to the horizontal, means are, of course, provided for attaching the plate frame and the plates.

Figs. 11 and 12 show an arrangement for the sterilization of water flowing through a pipe or being discharged from a pipe in a horizontal direction. In these figures:

Fig. 11 is a longitudinal section taken on line 11—11 of Fig. 12, and

Fig. 12 is a cross section taken on the line 12—12 of Fig. 11.

In the vertical branch arm 35 of a T-piece 36 the plate aggregate is suspended, this latter containing in concentric arrangement a thick tubular anode 37 of silver and an external and an internal thin copper tube cathode 38. The plate aggregate is protected externally by means of an insulating shell 39. The latter is fixed to a plate 42 by means of laterally arranged insulating carriers 40 in the interior of which the current leads 41 are arranged, the said plate 42 being fixed to the flange of the branch arm 35 by means of screws. On the outer side of the cover 42 terminals 43 for the leads are arranged.

Fig. 13 shows an apparatus for the production of concentrated oligodynamically active substance in perspective.

The device consists of a bath 44 for the reception of the dilute electrolytes, in which bath two thin silver plate anodes 45 and three thin copper plate cathodes 46 are suspended. The anode and cathode plates are connected by means of bridges 47 and 48 respectively. The said figure 13 also illustrates the current supply from a source of current together with a regulating resistance 49, an amperemeter 50 and a volt meter 51.

Figs. 14 and 15 show in front and in side elevation respectively an apparatus constructed in the form of an immersion member provided with non-corrodible anodes for the sterilization of small quantities of water.

The part which is intended to be immersed consists of nine plates 52 of Krupp steel V2a of about an area of 10 x 2 cm. which are fixed parallel to one another at a distance of 1 to 2 millimetres apart in a handle 53 and which serve alternately as an anode and cathode for current supplied by one or two accumulators. The plates are alternately connected as anodes and cathodes and are separated by means of insulating pins 54. The current is supplied to the plates through the handle.

Figs. 16 and 17 show an apparatus having non-corrodible anodes for the sterilization of larger quantities of water.

Fig. 16 is a section taken on line 16—16 of Fig. 17, and

Fig. 17 is a view from above. The water to be sterilized passes from below through the pipe 55 into a funnel-shaped box 56 mounted thereon. In the upper part 57 of the box, which part is of square cross section, an insulated plate frame 58 is mounted. The frame contains numerous plates 59 of Krupp steel V2a arranged parallel to one another and connected alternately as anodes and cathodes. To the box 56 which is open at the top a box 61 likewise open at the top and provided with a lateral outlet 60 is connected by means of a flange. The water flows in the sterilized condition downwards through the outlet 60 whilst the gases developed during the electrolysis can escape freely at the top.

Figs. 18 to 20 show an immersion member having non-corrodible anodes for the sterilization of physiological solutions.

Fig. 18 is a side elevation,

Fig. 19 a longitudinal section, and

Fig. 20 a view of the under side.

The apparatus consists of two small platinum plates 62 each having a surface of about 2 x 2 cm. and serving as electrodes. The said plates are fixed at their outer part to insulating plates 63 and are arranged parallel to one another at a distance of 1 to 2 millimetres apart upon a rod 64 serving as a handle. The current supply leads for the small platinum plates are led through the interior of the rod or handle 64.

We claim:

1. A process for the production of oligodynamically active substances in water, on surgical instruments and in the form of concentrated solutions and powder, consisting in obtaining for these purposes oligodynamically active silver by passing an electric current through a dilute chloride-containing electrolyte of a strength of not more than N/20 between an insoluble cathode and a silver-containing anode; the voltage, the concentration of the electrolyte, the superficial area of the electrodes, and the distance apart of the latter from one another being so chosen that current densities of comparatively large magnitude are continuously maintained and low current densities are continuously avoided.

2. A process for the sterilization of water according to claim 1, in which anodes according to the composition of the water are arranged at a distance of about 1 to 2 centimeters away from the cathodes, the said distance varying with the concentration of the electrolyte.

3. A process for the production of aligodynamically active substances in the form of colloidal solutions which comprises passing a direct current from a silver anode to an insoluble cathode through a chloride solution containing a protective colloid and having a concentration of approximately N/500.

4. A process for the sterilization of water according to claim 1 in which the voltage is about 9 volts and the current density is approximately .8 ampere per 100 sq. cm., and in which anodes according to the composition of the water are arranged at a distance of about 1 to 2 centimeters away from the cathodes, the said distance varying with the concentration of the electrolyte.

5. The process according to claim 1 in which the oligodynamically active substances formed are obtained in the form of powder.

WALTER KRUSE.
MAXIMILIAN JOHANN FISCHER.